May 4, 1954

J. B. KLINGEL 2,677,504

METHOD OF MIXING, VACUUM DRYING, AND
PULVERIZING AN ORTHO-CELLUTONE DYE

Filed May 9, 1952

INVENTOR.
John B. Klingel
BY
Popp and Sommer
Attorneys.

INVENTOR.
John B. Klingel
BY Popp and Sommer
Attorneys.

Patented May 4, 1954

2,677,504

UNITED STATES PATENT OFFICE 2,677,504

METHOD OF MIXING, VACUUM DRYING, AND PULVERIZING AN ORTHO-CELLUTONE DYE

John B. Klingel, Titusville, Pa., assignor to Struthers Wells Corporation, Titusville, Pa., a corporation of Maryland Application May 9, 1952, Serial No. 286,923

4 Claims. (Cl. 241—17)

This invention relates to a method of mixing, drying and granulating or powdering materials forming a cellular mass when dried under high vacuum and which have excessively high power requirements when the mixing, drying and granulating is attempted in a vacuum mixer as an uninterrupted process. Examples of such materials are dyes such as the ortho-cellutones with a dispersing agent to render it flocculent, the dispersing agent being usually in the form of a lignin compound such as lignin sulfide. Such dyes are not water soluble but are mixed with water in which the dyes are suspended or dispersed with the aid of the dispersing agent.

As now practiced such materials are mixed in a power mixer or kneading machine and are partially dried by the application of heat while kneading the materials. As the materials approach dryness, the power requirements rise excessively and accordingly just before this point of maximum power requirement the materials are transferred to vacuum pans where drying of the materials is completed. Following this drying in the vacuum pans the material is broken to a size to be fed to a grinder and transferred to the grinder in which it is reduced to a powder. The mixing, drying and grinding of the materials by this method requires about fifty hours, this including the delays incident to transfer of the materials from the power mixer or kneading machine to the vacuum pan and then to the grinder.

It is the principal object of the present invention to effect the mixing, drying and pulverizing of such materials in a single piece of apparatus, namely a power mixer or kneading machine, and with reduced power consumption and without requiring an excessively powerful mixer or kneading machine.

Another important object of the present invention is to effect the mixing, drying and pulverizing of such materials in a short length of time, the present process requiring in the order of about two hours as compared with the fifty hours now required.

Another important object is to provide such a process which operates for the most part under atmospheric pressure or a moderate vacuum and only requires a high vacuum for a limited period of its operation.

Another object is to provide such a process which can be practiced with or without the application of heat.

Another object is to provide such a mixing, drying and pulverizing process in which the horsepower per pound requirements are very greatly reduced.

Other objects and advantages of the present invention will be apparent from the following description and accompanying drawings in which.

Figure 1:
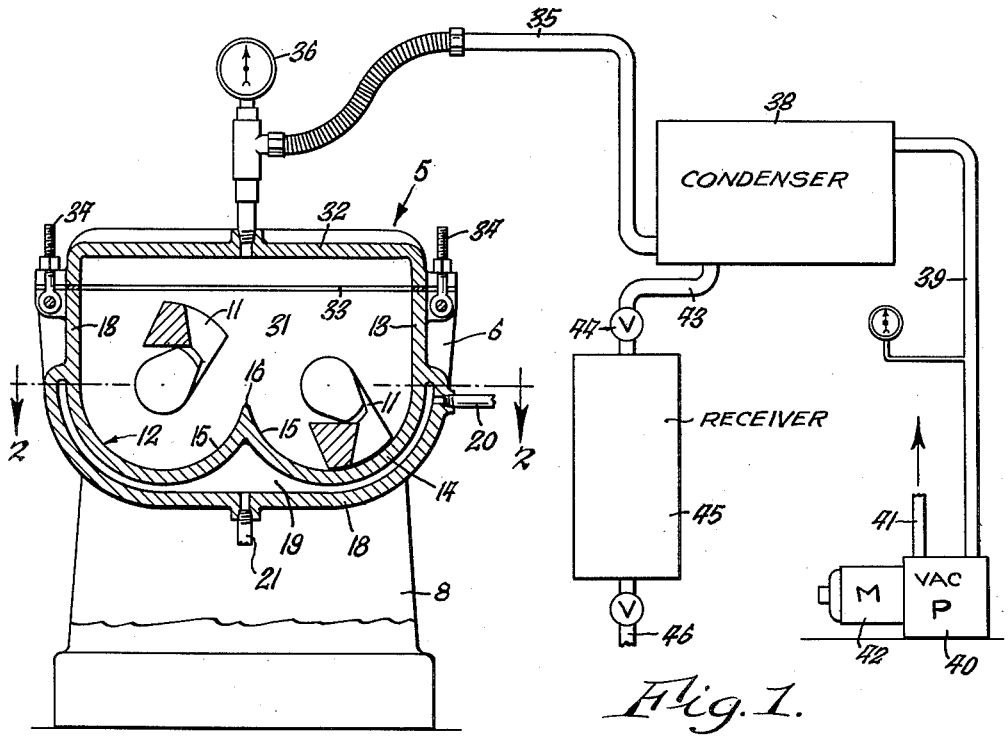
Fig. 1 is a transverse section through a heated, vacuum type mixing or kneading machine suitable for carrying out the present invention and showing diagrammatically the associated vacuum equipment.
Figure 2:
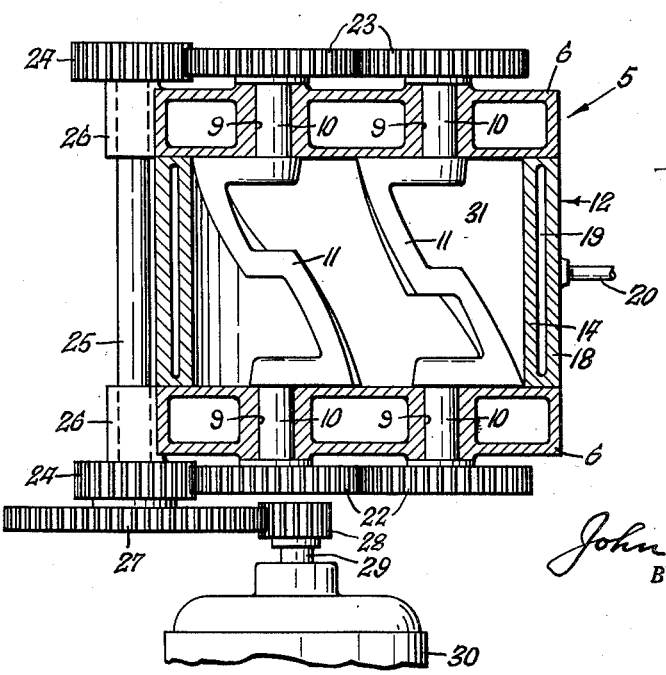
Fig. 2 is a horizontal sectional view taken on line 2—2, Fig. 1.

In Figs. 1 and 2 is illustrated a conventional mixing or kneading machine 5 capable of being heated and of having its interior or working space placed under vacuum. While this machine can be of any suitable construction, it is shown as comprising end heads 6 supported by end stands 8 and each having two horizontally spaced bearings 9 aligned with the bearings 9 of the other end head. In these bearings 9 are journalled, the shafts 10 of a pair of kneading blades 11 which are shown as being of sigma form and arranged so that the rotation of the radially salient portions of the two blades interact to effect rapid mixing and kneading of the materials.

The kneading blades 11 work in a U-shaped shell or container 12 having side walls 13 and the ends of which shell are secured to and enclosed by the end heads 6. The bottom 14 of the shell 12 is formed to provide two semi-cylindrical working faces 15 rising to a common ridge peak 16 at the center of the machine, these faces 15 being severally concentric with the axes of rotation of the blades 11 and these blades traveling in closely spaced relation to these faces.

The bottom 14 of the shell 12 is jacketed as at 18 to provide a steam space 19. The steam can be introduced through an inlet pipe 20 and the condensate drained at 21.

While the kneading blades can be rotated from a pair of equal sized intermeshing gears 22 at one end only of the machine, these blades are shown as having a similar pair of gears 23 at its opposite end. One gear 22, 23 of each pair is shown as driven by a pinion 24 fast to a countershaft 25 journalled in bearings 26. A large driving gear 27 is shown as fast to one end of this countershaft 25 and as driven by a pinion 28 on the shaft 29 of an electric motor 30. The small size of the kneading machine 5 and electric motor 30 as well as the small power consumption of this motor are important features of the present invention as hereinafter explained.

The space or working chamber 31 within the mixing or kneading machine 5 is adapted to be placed under vacuum and to this end it is provided with a cover 32, a sealing gasket 33 being shown as interposed between the rim of this cover and the top of the end heads 6 and shell 12 of the machine. Swing bolts 34 are shown as removably securing the cover 32 in place. The cover is shown as connected with a vacuum line 35 containing a gage 36 and connected to a condenser 38 the other end of which connects through a line 39 with a vacuum pump 40 having a discharge 41. The vacuum pump 40 is shown as driven by an electric motor 42. The condensate collecting in the receiver 38 can flow through a line 43 under control of a valve 44 into a receiver 45. This receiver is shown as having a valved drain 46.

Figure 4:
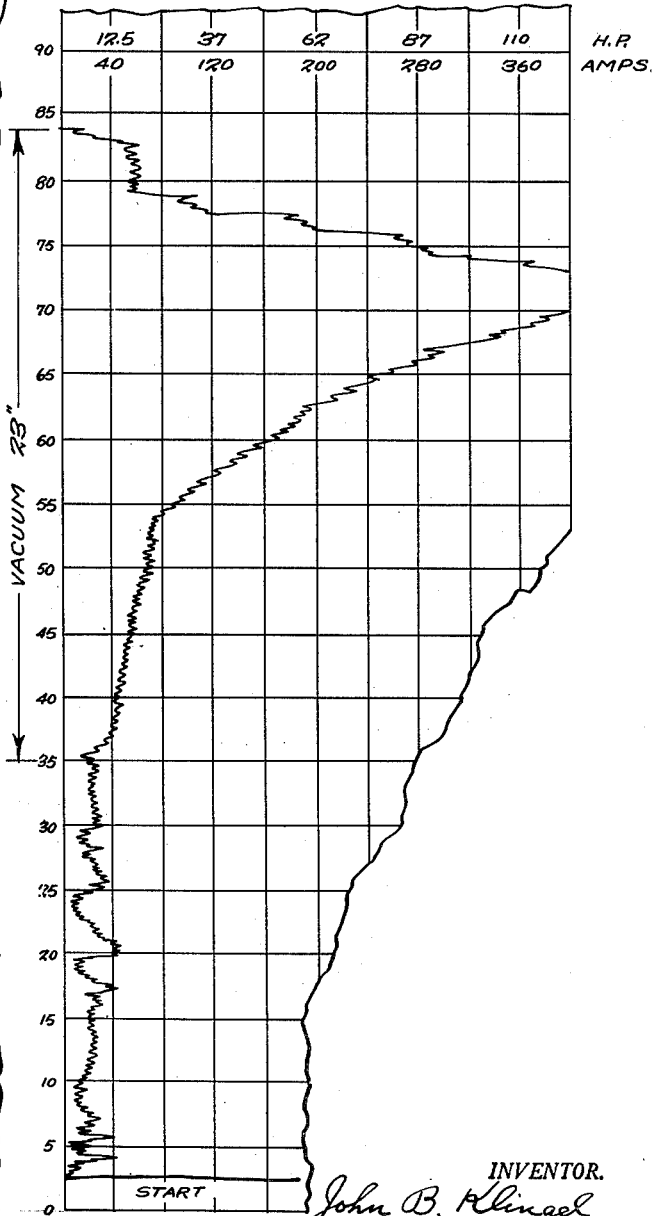
Fig. 4 is a similar power chart showing the consumption of power when mixing, drying and pulverizing is attempted as a continuous mechanical operation in contrast to interrupting the operation of the mixing or kneading machine in accordance with the present invention.

In mixing, drying and pulverizing a suspension of an ortho-cellutone dye in water also containing lignin sulfide as a dispersing agent for the ortho-cellutone, the aqueous suspension was found to form a puffy or cellular mass when dried under high vacuum and hence it was felt that by the application of heat and high vacuum to the mixer 5 the ortho-cellutone could be reduced satisfactorily to a powdered state by keeping the mixer continuously in operation. The results of this attempt are illustrated in Fig. 4 which is a chart of the electric power drawn by the motor 30 over the time indicated and also shows where in the cycle a vacuum of 23 inches of mercury was applied.

Steam was supplied to the jacket space 19 at 40 pounds gage pressure, and the mixer blades 11 were rotated at 40 R. P. M. Following the motor starting peak, the power requirements of the motor 30 were quite erratic due to the blades encountering lumps in the mixture until at 30 minutes the power curve leveled off. After a 35 minute interval a vacuum of 23 inches of mercury was applied through the vacuum line 35 to the working chamber 31 of the kneading machine. As the mixture became drier the power consumption of the motor 30 gradually increased until at about 54 minutes the power curve rose sharply and at 70 minutes left the chart. During this sharp rise the material was approaching dryness and the motor 30 was heavily overloaded and the kneading machine 5 heavily overtaxed. After the material was carried through to dryness and reduced to a powder the power requirements were reduced to a low value at about 79 minutes and leveled off. This run produced typical power curves and was not satisfactory since in production an extremely heavy duty motor 30 and kneading machine 5 would be required for only a small part of the run.

Figure 3:
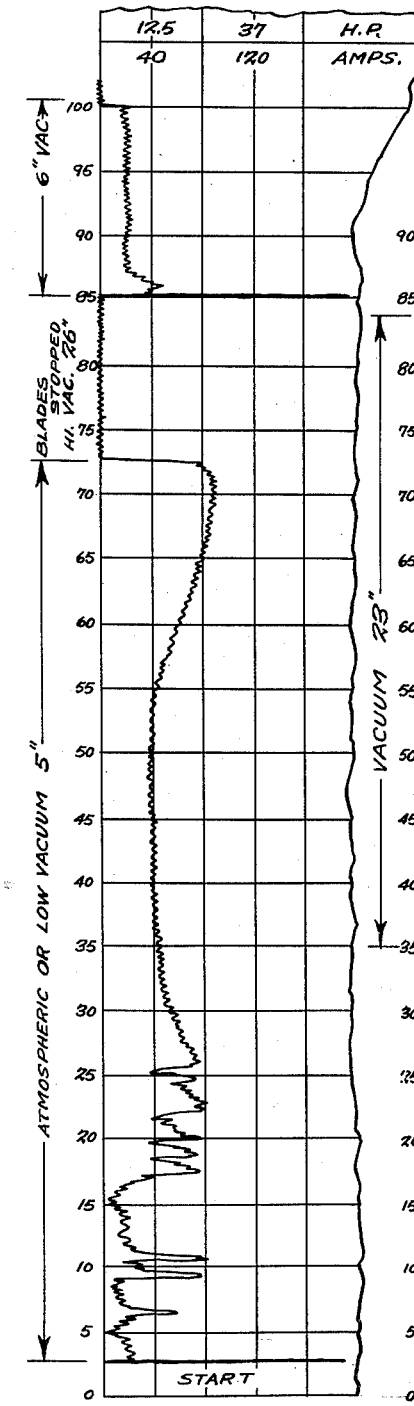
Fig. 3 is an electric power chart showing the consumption of power during the practice of the present invention.

The practice of the invention is illustrated in the graph, Fig. 3. In this run steam at 40 pounds pressure was supplied to the jacket space 19 and the blades 11 were rotated at about 40 R. P. M. although this speed was reduced to 25 R. P. M. when the kneading machine started to labor. No vacuum was applied to the working chamber 31. Following the motor starting peak, the power curve, as with the graph, Fig. 4, was quite erratic for the first half hour due to the blades encountering lumps in the mixture. In about 55 minutes the power curve started to rise and at about 73 minutes the motor 30 was stopped completely to avoid the excessive peak shown in Fig. 4. At the same time a high vacuum of 26 inches of mercury was applied to the working chamber 31 for about 12 minutes, the motor 30 being deenergized during the period. At the end of 85 minutes the motor 30 was started and following the normal starting peak the power requirements were surprisingly low and rapidly leveled off to the low value of about 6 horsepower or 20 amps.

Subsequent tests were made without introducing steam in the jacket space 19 and other tests were made during which a low vacuum of 5 inches of mercury was maintained from the start of the run to the time the blades 11 were stopped and the high vacuum of 26 inches of mercury was applied. This high vacuum was reduced to six inches when rotation of the blades 11 was resumed. While the heating and use of this low vacuum during drying accelerated the process, the power curves were generally the same as shown in Fig. 3.

Comparing the power charts of Figs. 4 and 3, it was found that the practice of the present invention required the expenditure of approximately $\frac{1}{16}$ horsepower per pound of material as compared with $\frac{1}{2}$ horsepower per pound of material in attempting to carry through the entire operation without stopping the blades 11.

It will be seen that the present process is applicable to mixing, drying and granulating or powdering materials forming a cellular mass when dried under high vacuum and which require excessively high power to knead as they approach a state of substantially complete dryness. Essentially the invention involves discontinuing the agitation of the material as it approaches a state of dryness, and which condition can be determined by a rapid rise of the power curve of the motor doing the agitating, applying a high vacuum for a substantial number of minutes to fluff up the material to a cellular mass and then resuming agitation by which the cellular mass is reduced to powder with little expenditure of power. Desirably heat and a low initial vacuum can be used in conjunction with the process.

I claim:

1. The method of mixing, drying and pulverizing an ortho-cellutone dye in a water suspension containing a dispersion agent, which method comprises placing said material in a container, agitating and drying said material while in said container until the material in said container approaches a state of substantially complete dryness, discontinuing said agitating and applying a high vacuum to said container to complete substantially the drying of said material and fluffing thereof into a cellular mass, and thereafter resuming the said agitating of said material while in said container to pulverize the material.

2. The method of mixing, drying and pulverizing an ortho-cellutone dye in a water suspension containing a dispersion agent, which method comprises placing said material in a container, agitating, heating and drying said material while in said container until the material in said container approaches a state of substantially complete dryness, discontinuing said agitating and applying a high vacuum to said container to complete substantially the drying of said material and fluffing thereof into a cellular mass, and thereafter resuming the said agitating of said material while in said container to pulverize the material.

3. The method of mixing, drying and pulverizing an ortho-cellutone dye in a water suspension containing a dispersion agent, which method comprises placing said material in a container, agitating and drying said material while in said container under a low vacuum until the material in said container approaches a state of substantially complete dryness, discontinuing said agitating and applying a high vacuum to said container to complete substantially the drying of said material and fluffing thereof into a cellular mass, and thereafter resuming the said agitating of said material while in said container to pulverize the material.

4. The method of mixing, drying and pulverizing an ortho-cellutone dye in a water suspension containing a dispersion agent, which method comprises placing said material in a container, agitating and drying said material while in said container until the material in said container approaches a state of substantially complete dryness, discontinuing said agitating and applying a high vacuum in the order of 26 inches of mercury to said container to complete substantially the drying of said material and fluffing thereof into a cellular mass, and thereafter resuming the said agitating of said material while in said container to pulverize the material.

References Cited in the file of this patent

UNITED STATES PATENTS

| Number | Name | Date |
|---|---|---|
| 705,034 | Cameron | July 22, 1902 |
| 962,118 | Bradley | June 21, 1910 |
| 1,250,496 | Passburg | Dec. 18, 1917 |